(12) United States Patent
Mitsuya

(10) Patent No.: US 12,351,077 B2
(45) Date of Patent: Jul. 8, 2025

(54) VEHICLE BRAKE DEVICE

(71) Applicant: TOYOTA JIDOSHA KABUSHIKI KAISHA, Toyota (JP)

(72) Inventor: Shun Mitsuya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/482,148

(22) Filed: Oct. 6, 2023

(65) Prior Publication Data

US 2024/0198807 A1 Jun. 20, 2024

(30) Foreign Application Priority Data

Dec. 19, 2022 (JP) ................. 2022-202009

(51) Int. Cl.
*B60L 7/26* (2006.01)

(52) U.S. Cl.
CPC ...................... *B60L 7/26* (2013.01)

(58) Field of Classification Search
CPC ...... B60T 13/10; B60T 13/14; B60T 13/141–145; B60T 13/146; B60T 13/686; B60T 13/745; B60T 8/341; B60T 17/221; B60T 2270/60; B60T 7/00

See application file for complete search history.

(56) References Cited

U.S. PATENT DOCUMENTS

| | | | | |
|---|---|---|---|---|
| 6,238,019 B1* | 5/2001 | Okazaki | ............... | B60T 8/4872 303/146 |
| 2007/0267915 A1* | 11/2007 | Shimada | ............... | B60W 10/08 303/122 |
| 2011/0285199 A1* | 11/2011 | Ishida | ................... | B60T 13/686 303/3 |
| 2013/0127236 A1* | 5/2013 | Hakiai | ................... | B60T 17/04 303/3 |
| 2015/0314765 A1* | 11/2015 | Maruo | ................. | B60T 8/4827 303/10 |

FOREIGN PATENT DOCUMENTS

JP 2020-100318 A 7/2020
JP 2021-059129 A 4/2021

* cited by examiner

*Primary Examiner* — John Kwon
(74) *Attorney, Agent, or Firm* — SoraIP, Inc.

(57) ABSTRACT

The regulating valve and the pressure reducing valve are closed, and the low-pressure accumulator is connected to the hydraulic brake via the pressure reducing valve. When the regenerative braking force reaches the upper limit, the braking ECU switches the connection destination of the low-pressure accumulator from the hydraulic brake to the hydraulic brake by opening and closing the regulating valve and the pressure reducing valve in order to introduce the hydraulic braking force. The booster causes the brake pedal to generate a reaction force corresponding to the pressure loss caused by the opening and closing of each valve.

2 Claims, 7 Drawing Sheets

VEHICLE BRAKE DEVICE

CROSS-REFERENCE TO RELATED APPLICATION

This application claims priority to Japanese Patent Application No. 2022-202009 filed on Dec. 19, 2022, incorporated herein by reference in its entirety.

BACKGROUND

1. Technical Field

The present disclosure relates to a vehicle brake device.

2. Description of Related Art

A vehicle brake device including a hydraulic brake and a regenerative brake and capable of performing regenerative coordination is known. The hydraulic brake is a brake that generates a hydraulic braking force by using a hydraulic pressure generated in response to a brake operation by a driver. The regenerative brake is a brake that generates a regenerative braking force. The regenerative coordination is control that distributes a braking force to the hydraulic braking force and the regenerative braking force.

Japanese Unexamined Patent Application Publication No. 2021-59129 (JP 2021-59129 A) describes a vehicle brake device that compensates for a shortage of the regenerative braking force by the hydraulic braking force of either a front wheel or a rear wheel.

The vehicle brake device described in JP 2021-59129 A includes a first regulating valve, a first pressure reducing valve, a second regulating valve, and a second pressure reducing valve. The first regulating valve regulates a flow rate of a brake fluid supplied to a hydraulic brake of the front wheel. The first pressure reducing valve reduces a pressure of the hydraulic braking force of the front wheel. The second regulating valve regulates a flow rate of a brake fluid supplied to a hydraulic brake of the rear wheel. The second pressure reducing valve reduces a pressure of the hydraulic braking force of the rear wheel. The vehicle brake device includes a low-pressure accumulator. When the pressure is reduced by the first pressure reducing valve, the low-pressure accumulator and the hydraulic brake of the front wheel are connected via the first pressure reducing valve, and the brake fluid is supplied to the low-pressure accumulator. When the pressure is reduced by the second pressure reducing valve, the low-pressure accumulator and the hydraulic brake of the rear wheel are connected via the second pressure reducing valve, and the brake fluid is supplied to the low-pressure accumulator.

SUMMARY

When the regenerative braking force reaches an upper limit, connection destination of a low-pressure accumulator may be switched in order to introduce the hydraulic braking force and compensate for a shortage of the braking force. In order to switch the connection destination, the first regulating valve, the first pressure reducing valve, the second regulating valve, and the second pressure reducing valve are controlled to be opened and closed. When each valve is opened and closed, a pressure loss is generated, and due to the pressure loss, the depression force in a brake pedal fluctuates. For example, when the target pressure of the hydraulic brake is set without considering the pressure loss, the depression force becomes lighter by the pressure loss, and a feeling of being drawn into the brake pedal is generated.

An object of the present disclosure is to suppress fluctuation of the depression force caused by switching of the connection destination of the low-pressure accumulator in the vehicle brake device capable of performing the regenerative cooperation by the hydraulic braking force and the regenerative braking force.

One aspect of the present disclosure includes a first hydraulic brake for generating a hydraulic braking force on a front wheel of a vehicle;
  a second hydraulic brake for generating a hydraulic braking force on a rear wheel of the vehicle;
  a regenerative brake for generating a regenerative braking force by converting kinetic energy to the front wheel;
  a booster for amplifying a depression force applied to a brake pedal and supplying the depression force to the first hydraulic brake or the second hydraulic brake by a brake fluid as the hydraulic braking force;
  a first regulating valve that is provided between the booster and the first hydraulic brake and that regulates a flow rate of the brake fluid supplied to the first hydraulic brake;
  a first pressure reducing valve for reducing a pressure of the hydraulic braking force of the first hydraulic brake;
  a second regulating valve that is provided between the booster and the second hydraulic brake and that regulates a flow rate of the brake fluid supplied to the second hydraulic brake;
  a second pressure reducing valve for reducing a pressure of the hydraulic braking force of the second hydraulic brake; a low-pressure accumulator to which the brake fluid is supplied when the pressure is reduced by the first pressure reducing valve or the second pressure reducing valve; and
  a control device for controlling opening and closing of the first regulating valve, the first pressure reducing valve, the second regulating valve, and the second pressure reducing valve, in which:
  the vehicle brake device is able to distribute a braking force to the hydraulic braking force and the regenerative braking force;
  when the regenerative braking force reaches an upper limit in a state in which the first regulating valve and the first pressure reducing valve are closed, and the low-pressure accumulator is connected to the second hydraulic brake via the second pressure reducing valve, the control device switches connection destination of the low-pressure accumulator from the second hydraulic brake to the first hydraulic brake by opening and closing the first regulating valve, the first pressure reducing valve, the second regulating valve, and the second pressure reducing valve so as to introduce the hydraulic braking force; and
  the booster generates, on the brake pedal, a reaction force corresponding to a pressure loss caused by the opening and closing of the first regulating valve, the first pressure reducing valve, the second regulating valve, and the second pressure reducing valve.

According to the present disclosure, in the vehicle brake device capable of performing the regenerative cooperation by the hydraulic braking force and the regenerative braking force, it is possible to suppress the fluctuation in the depression force caused by switching of the connection destination of the low-pressure accumulator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
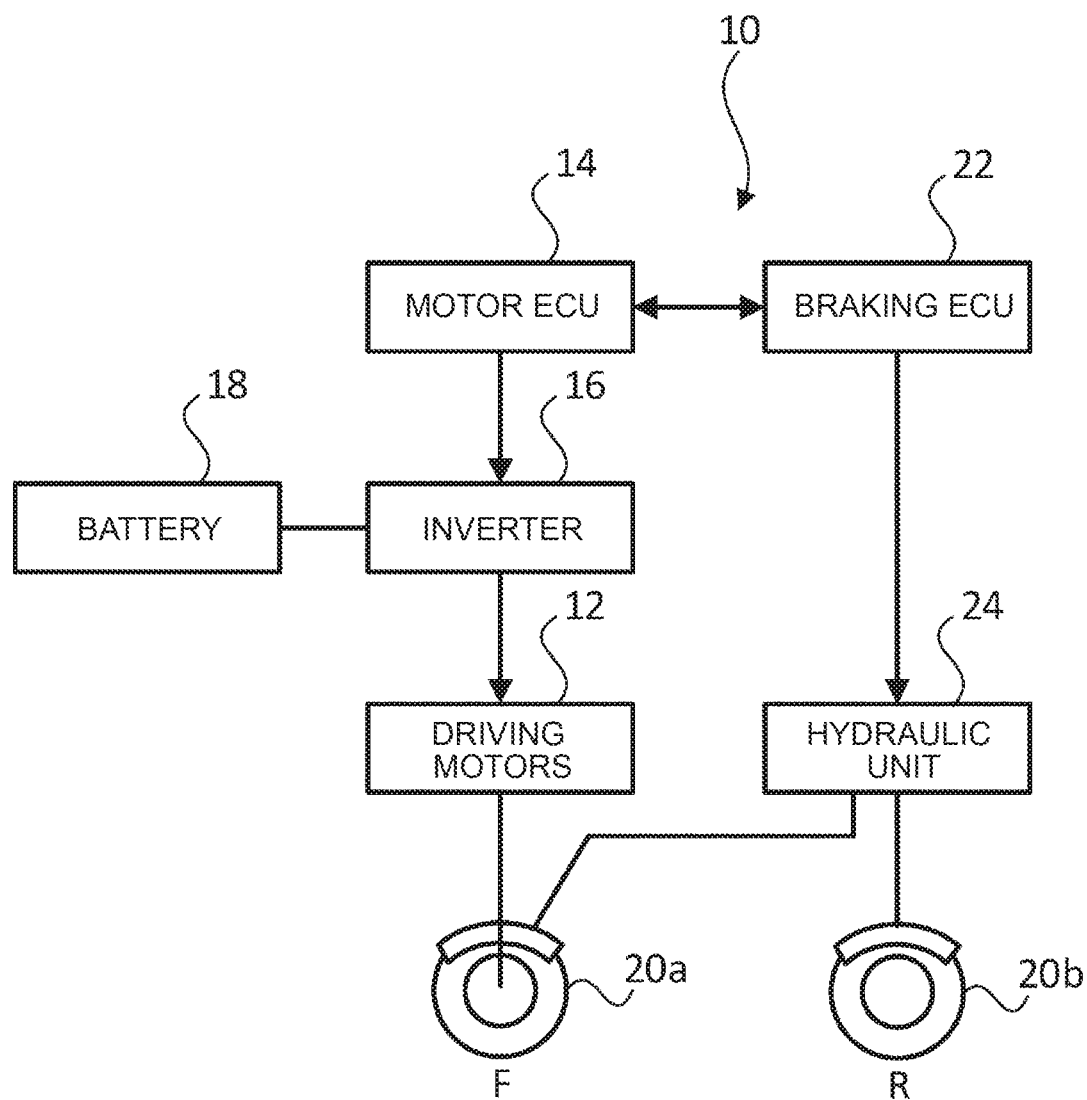
FIG. 1 is a schematic diagram illustrating a configuration of a vehicle brake device according to an embodiment.

A vehicle brake device according to the present embodiment will be described with reference to FIG. 1. FIG. 1 schematically illustrates a configuration of a vehicle brake device. The vehicle brake device 10 is mounted on a vehicle and generates a braking force in response to a request from a driver. FIG. 1 shows one front wheel F and one rear wheel R of a vehicle for convenience of explanation.

The vehicle brake device 10 includes a hydraulic brake and a regenerative brake using kinetic energy of the front wheel F. The vehicle brake device 10 distributes the braking force to the hydraulic braking force and the regenerative braking force in accordance with the braking force required by the driver.

The vehicle brake device 10 includes a driving motor 12, a motor ECU 14, an inverter 16, a battery 18, a hydraulic brake 20a,20b, a braking ECU 22, and a hydraulic unit 24.

The driving motor 12 functions as a driving source for driving the front wheels F during traveling of the vehicle, and functions as a generator during braking to generate a regenerative braking force on the front wheels F.

The motor ECU 14 controls the operation of the inverter 16 to supply the electric power of the battery 18 to the driving motor 12 or to charge the battery 18 with the regenerative electric power generated by the driving motor 12.

The hydraulic brake 20a generates a hydraulic braking force corresponding to the hydraulic pressure supplied to the front wheel F. The hydraulic brake 20b generates a hydraulic braking force corresponding to the hydraulic pressure supplied to the rear wheel R.

The braking ECU 22 controls the hydraulic pressure of the brake fluid supplied to each of the hydraulic brake 20a, 20b. Specifically, the braking ECU 22 controls the operation of the hydraulic unit 24 to adjust the hydraulic pressure supplied to each of the hydraulic brake 20a, 20b. For example, the braking ECU 22 adjusts the reaction force depending on the feedforward control. The braking ECU 22 corresponds to an exemplary control device.

In the present embodiment, as an example, the vehicle brake device 10 can generate a hydraulic braking force and a regenerative braking force with respect to the front wheel F, and can generate a hydraulic braking force with respect to the rear wheel R.

The motor ECU 14 and the braking ECU 22 may communicate via a network-such as ControllerAreaNetwork (CAN). Further, the braking ECU 22 controls the regenerative brake force generated in the front wheel F by outputting the regenerative brake command to the motor ECU 14.

The motor ECU 14 and the braking ECU 22 include, for example, Central Processing Unit (CPU), Graphics Processing Unit (GPU), Application Specific Integrated Circuit (ASIC), Field Programmable Gate Array (FPGA), Digital Signal Processor (DSP), other programmable logic devices, electronic circuitry, and the like.

The functions of the motor ECU 14 and the braking ECU 22 are realized by the cooperation of hardware resources and software resources. For example, CPU reads and executes a program stored in the storage device, thereby realizing the respective functions. The program is stored in the storage device via a recording medium such as a CD or a DVD, or via a communication path such as a network. Alternatively, the functions of the motor ECU 14 and the braking ECU 22 may be implemented by hardware-resources, such as electronic circuitry.

Figure 2:
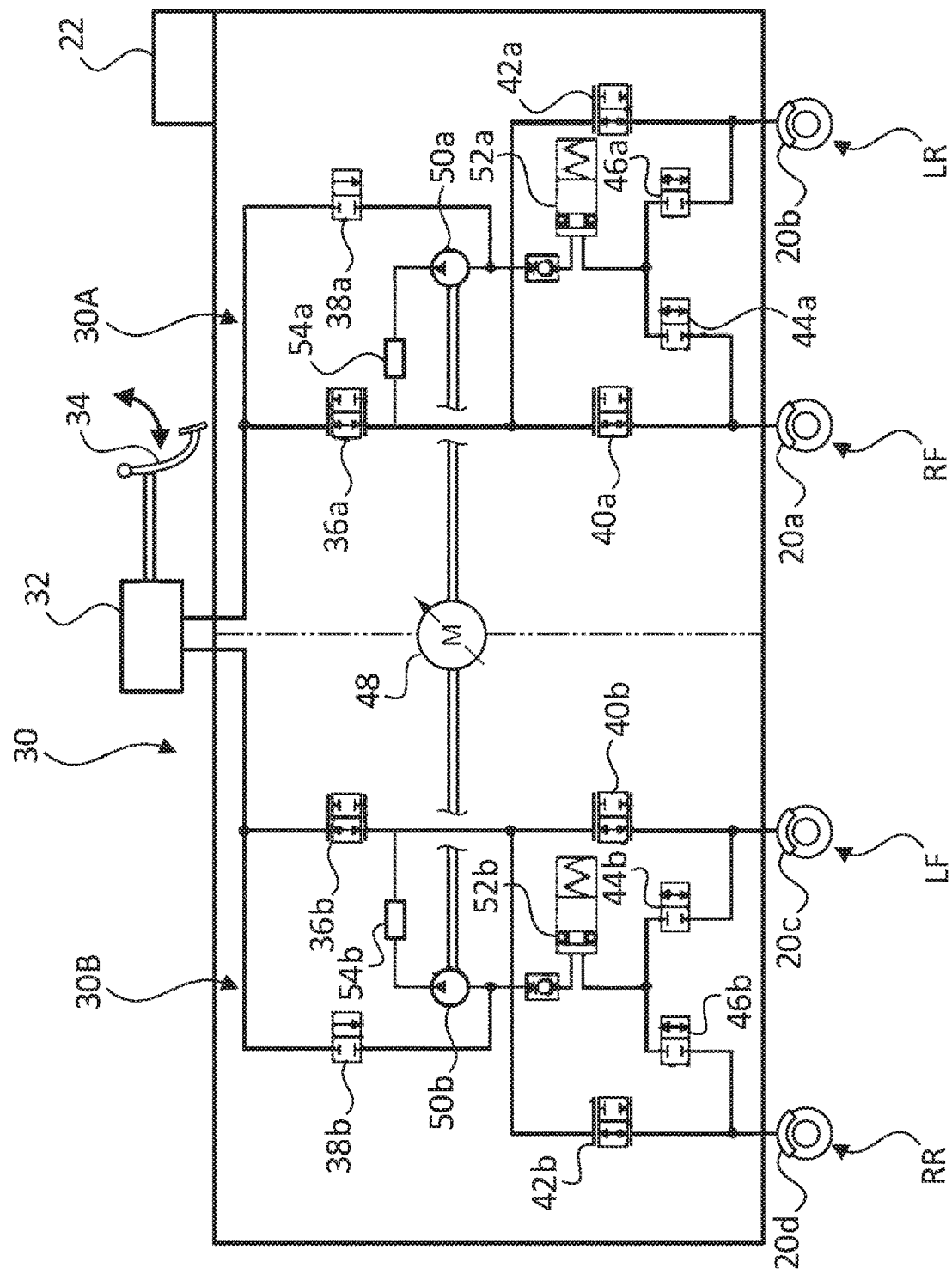
FIG. 2 is a diagram showing a hydraulic circuit constituting a hydraulic brake in a vehicle brake device.

Hereinafter, the hydraulic circuit 30 constituting the hydraulic brake will be described with reference to FIG. 2. FIG. 2 shows a right front wheel RF, a left rear wheel LR, a left front wheel LF, and a right rear wheel RR. The hydraulic circuit 30 is, for example, a hydraulic circuit of a brake system for a four-wheeled vehicle. The hydraulic circuit 30 includes two brake systems, and is an X-type piping type hydraulic circuit. The hydraulic circuit 30 brakes the front wheel and the rear wheel at a position diagonal to the front wheel as a set for each system. The hydraulic circuit 30 may be applied to a vehicle such as a two-wheeled vehicle.

The hydraulic circuit 30 includes a booster 32. The booster 32 is an electric brake booster. When pressure is applied to the brake pedal 34, the booster 32 amplifies the stepping force added to the brake pedal 34 in response to the stepping operation, and moves the brake liquid into the hydraulic circuit 30. As a result, the hydraulic braking force is supplied to the hydraulic brake. The booster 32 generates a hydraulic braking force by a motor. The booster 32 has a function of adjusting a reaction force by a motor and supplying the reaction force to the brake pedal 34.

The hydraulic circuit 30 includes a first hydraulic circuit 30A and a second hydraulic circuit 30B. The first hydraulic circuit 30A and the second hydraulic circuit 30B have the same configuration, and the brake fluid is supplied from the booster 32.

Brake fluid is supplied to the wheel cylinder of the hydraulic brake 20a of the right front wheel RF and the wheel cylinder of the hydraulic brake 20b of the left rear wheel LR via the first hydraulic circuit 30A. Brake fluid is supplied to the wheel cylinder of the hydraulic brake 20c of the left front wheel LF and the wheel cylinder of the hydraulic brake 20d of the right rear wheel RR via the second hydraulic circuit 30B. As a result, the hydraulic brakes 20a to 20d can generate a braking force on the respective wheels by the hydraulic pressure.

Hereinafter, the first hydraulic circuit 30A will be described, and the description of the second hydraulic circuit 30B will be omitted.

The first hydraulic circuit 30A includes, as solenoid valves, a circuit control valve 36a, an intake valve 38a, a regulating valve 40a,42a which is a pressure increasing valve, and a pressure reducing valve 44a,46a. The first hydraulic circuit 30A includes a pump 50a driven by the pump motor 48, a low-pressure accumulator 52a, and a damper 54a. The braking ECU 22 controls opening and closing of the circuit control valve 36a, the intake valve 38a, the regulating valve 40a,42a, and the pressure reducing valve 44a,46a. The regulating valve 40a corresponds to an example of the first regulating valve, and the regulating valve 42a corresponds to an example of the second regulating valve. The pressure reducing valve 44a corresponds to an example of the first pressure reducing valve, and the pressure reducing valve 46a corresponds to an example of the second pressure reducing valve. The hydraulic brake 20a corresponds to an example of the first hydraulic brake, and the hydraulic brake 20b corresponds to an example of the second hydraulic brake.

The regulating valve 40a and the pressure reducing valve 44a are used for Antilock Brake System (ABS) control or Electronic Stability Control (ESC) control of the right front wheel RF. The regulating valve 42a and the pressure reducing valve 46a are used for ABS control or ESF control of the left rear wheel LR.

The regulating valve 40a of the right front wheel RF is provided between the circuit control valve 36a and the hydraulic brake 20a. The regulating valve 40a is a linearly controllable valve. The regulating valve 40a continuously regulates the flow rate of the brake fluid from the circuit control valve 36a side to the wheel-cylinder side of the hydraulic brake 20a.

The pressure reducing valve 44a of the right front wheel RF is a solenoid valve that can be switched to either fully open or fully closed. The pressure reducing valve 44a is provided between the wheel cylinder of the hydraulic brake 20a and the low-pressure accumulator 52a. The pressure reducing valve 44a reduces the pressure of the brake fluid supplied to the wheel cylinder of the hydraulic brake 20a in the open condition. The pressure reducing valve 44a can adjust the flow rate of the brake fluid flowing from the wheel cylinder of the hydraulic brake 20a to the low-pressure accumulator 52a by intermittently repeating the opening and closing of the valve.

The regulating valve 42a of the left rear wheel LR is provided between the circuit control valve 36a and the hydraulic brake 20b. The regulating valve 42a is a linearly controllable valve. The regulating valve 42a continuously regulates the flow rate of the brake fluid from the circuit control valve 36a side to the wheel-cylinder side of the hydraulic brake 20b.

The pressure reducing valve 46a of the left rear wheel LR is a solenoid valve that can be switched to either fully open or fully closed. The pressure reducing valve 46a is provided between the wheel cylinder of the hydraulic brake 20b and the low-pressure accumulator 52a. The pressure reducing valve 46a reduces the pressure of the brake fluid supplied to the wheel cylinder of the hydraulic brake 20b in the open condition. The pressure reducing valve 46a can adjust the flow rate of the brake fluid flowing from the wheel cylinder of the hydraulic brake 20b to the low-pressure accumulator 52a by intermittently repeating the opening and closing of the valve.

The circuit control valve 36a is provided to communicate or disconnect between the regulating valve 40a, 42a and the booster 32. The intake valve 38a is provided to communicate or disconnect between the booster 32 and the suction-side of the pump 50a. A hydraulic pressure sensor is provided between the circuit control valve 36a and the intake valve 38a and the booster 32.

The second hydraulic circuit 30B controls the hydraulic brake 20c of the left front wheel LF and the hydraulic brake 20d of the right rear wheel RR. The wheel cylinder of the hydraulic brake 20a of the right front wheel RF is replaced by the wheel cylinder of the hydraulic brake 20c of the left front wheel LF, and the wheel cylinder of the hydraulic brake 20b of the left rear wheel LR is replaced by the wheel cylinder of the hydraulic brake 20d of the right rear wheel RR. In other configurations, the second hydraulic circuit 30B is configured similarly to the first hydraulic circuit 30A.

Hereinafter, the operation of the vehicle brake device 10 will be described. The operation of the first hydraulic circuit 30A will be described below, but the second hydraulic circuit 30B operates in the same manner.

Figure 3:
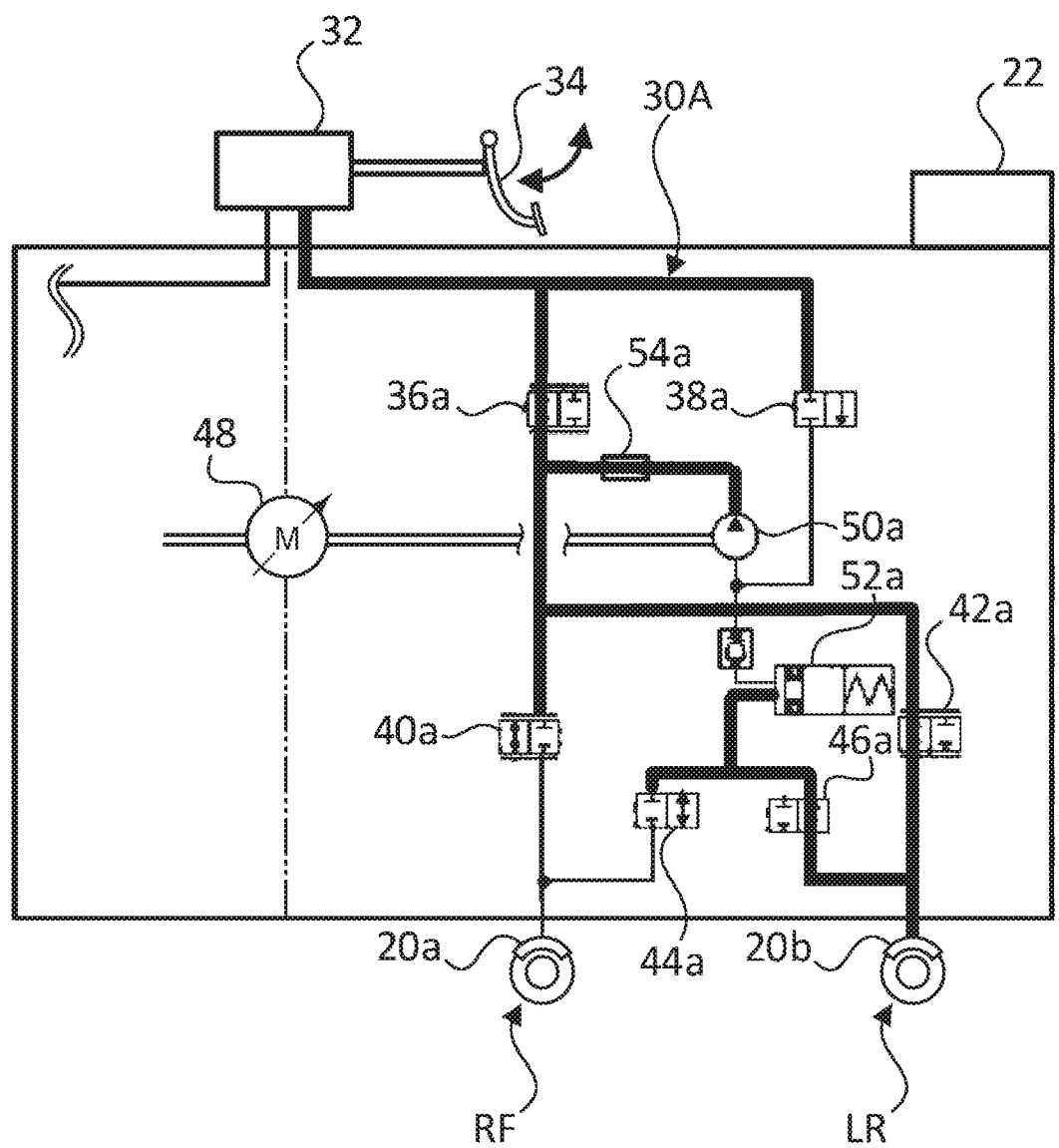
FIG. 3 is a diagram illustrating a state of the first hydraulic circuit when a braking force is generated only by the regenerative braking force.

FIG. 3 shows the condition of the first hydraulic circuit 30A when the braking force is generated only by the regenerative braking force. Hereinafter, the condition in which the braking force is generated only by the regenerative braking force is referred to as "OS1".

As shown in FIG. 3, while the braking force is generated only by the regenerative braking force, the circuit control valve 36a, the regulating valve 42a, and the pressure reducing valve 46a are maintained in the open state, and the intake valve 38a, the regulating valve 40a, and the pressure reducing valve 44a are maintained in the closed state. The brake fluid supplied from the booster 32 to the first hydraulic circuit 30A is not supplied to the hydraulic brake 20a of the right front wheel RF, but is supplied to the hydraulic brake 20b of the left rear wheel LR.

Since the pressure reducing valve 46a is maintained in the open state, the brake fluid supplied to the left rear wheel LR toward the hydraulic brake 20b is supplied to the low-pressure accumulator 52a via the pressure reducing valve 46a. Therefore, the hydraulic braking force is not generated in the hydraulic brake 20b of the left rear wheel LR, and the braking force is exerted only by the regenerative brake force generated in the right front wheel RF.

When the regenerative braking force reaches the upper limit while the low-pressure accumulator 52a is connected to the hydraulic brake 20b via the pressure reducing valve 46a, control is performed to compensate the insufficient braking force by the hydraulic braking force. Specifically, the braking ECU 22 switches the connection destination of the low-pressure accumulator 52a from the hydraulic brake 20b to the hydraulic brake 20a by opening and closing the regulating valve 40a, 42a and the pressure reducing valve 44a, 46a in order to introduce the hydraulic braking force. The case where the regenerative braking force reaches the upper limit is a case where the required braking force by the driver cannot be provided only by the regenerative braking force.

Figure 4:
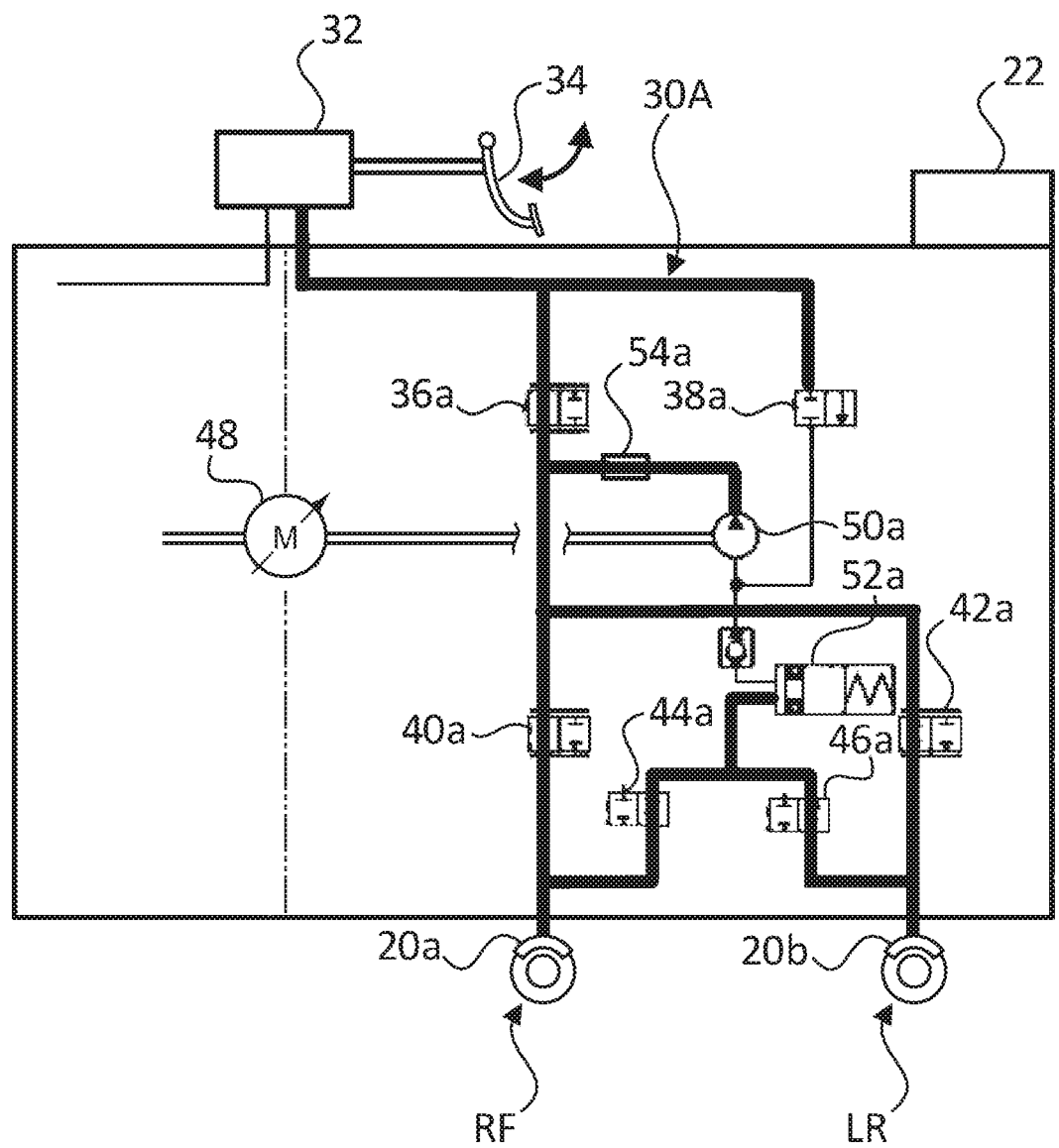
FIG. 4 is a view showing a state of the first hydraulic circuit when the hydraulic braking force is introduced.

Specifically, as shown in FIG. 4, the braking ECU 22 opens the regulating valve 40a. As a result, the brake fluid flows to the hydraulic brake 20a to increase the pressure. The braking ECU 22 then opens the pressure reducing valve 44a. After the pressure on the hydraulic brake 20a of the right front wheel RF is increased, the pressure reducing valve 44a is opened. Therefore, the brake fluid does not flow from the low-pressure accumulator 52a side to the hydraulic brake 20a side of the right front wheel RF via the pressure reducing valve 44a. Therefore, there is no need to provide filters in the pressure reducing valve 44a to prevent foreign matter from flowing from the low-pressure accumulator 52a to the hydraulic brake 20a. Hereinafter, the condition illustrated in FIG. 4 is referred to as "OSR".

Figure 5:
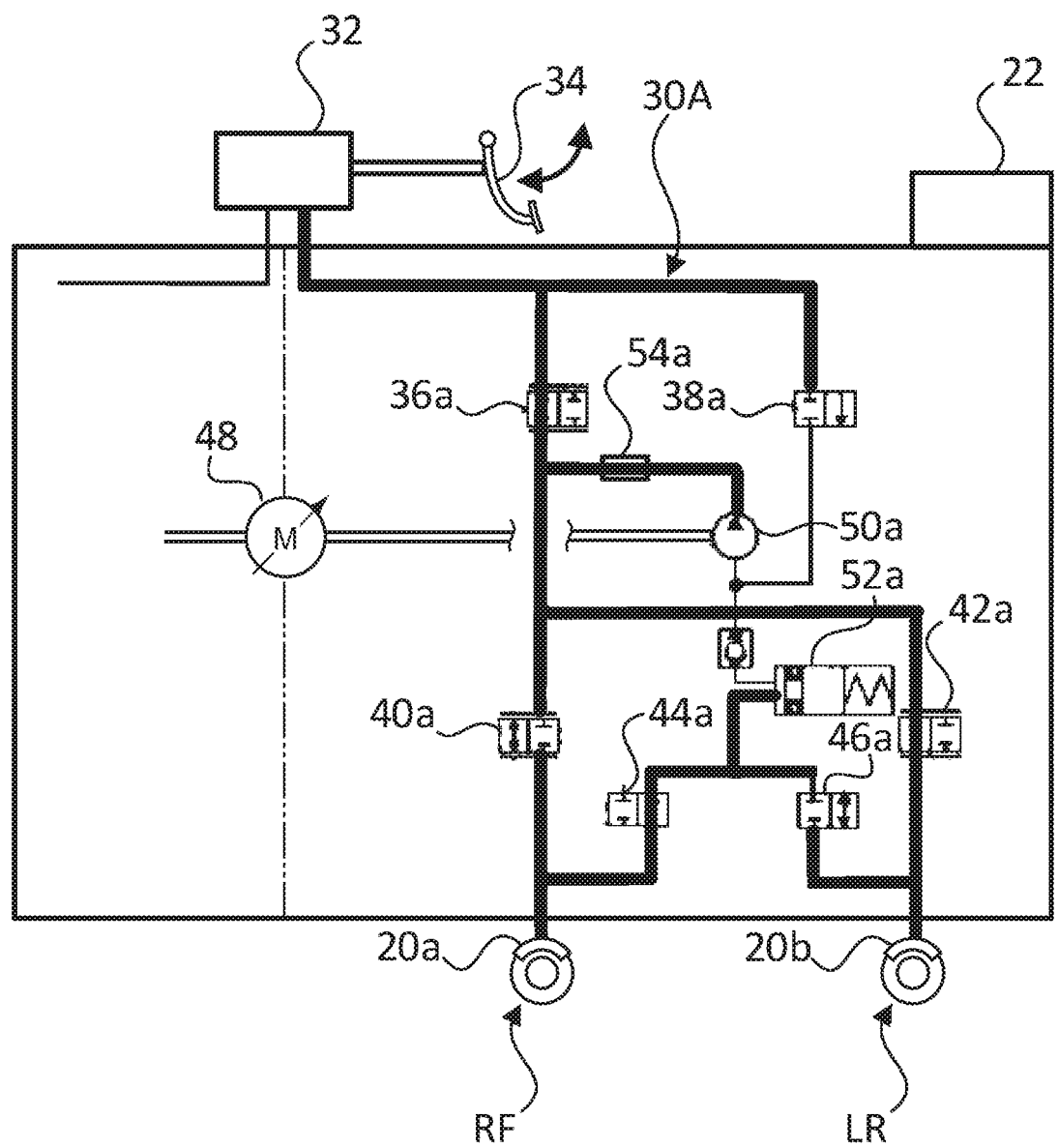
FIG. 5 is a view showing a state of the first hydraulic circuit when the hydraulic braking force is introduced.

Thereafter, as shown in FIG. 5, the braking ECU 22 closes the regulating valve 40a and the pressure reducing valve

46a. As a result, the brake fluid is supplied to the hydraulic brake 20b through the regulating valve 42a, and the hydraulic pressure of the hydraulic brake 20b on the left rear wheel LR is increased. As a result, the hydraulic braking force is supplied, and the braking force is distributed to the regenerative braking force and the hydraulic braking force. Hereinafter, the condition illustrated in FIG. 5 is referred to as "OS2".

Thereafter, the braking ECU 22 opens the regulating valve 40a at an opening degree corresponding to the required brake. Since the pressure reducing valve 44a is maintained in the open state, the brake fluid supplied to the right front wheel RF on the hydraulic brake 20a is supplied to the low-pressure accumulator 52a via the pressure reducing valve 44a. Therefore, in the hydraulic brake 20a of the right front wheel RF, a relatively small hydraulic braking force is generated in accordance with the spring force of the low-pressure accumulator 52a. Therefore, the regenerative braking force and the hydraulic braking force generated in the right front wheel RF and the hydraulic braking force generated in the left rear wheel LR exert a well-balanced braking force on the front and rear wheels. Hereinafter, a condition in which the regulating valve 40a is opened at an opening degree corresponding to the required braking is referred to as "OS4".

The maximum regenerative braking force that can be regenerated by the regenerative braking is limited by the vehicle speed at the time of braking of the vehicle, the state of charge of the battery, and the like. The remaining braking force obtained by subtracting the regenerative braking force from the required braking force of the driver is set as the target pressure of the hydraulic brake. The opening degree of the regulating valve 40a is adjusted so as to obtain the target pressure.

As shown in FIGS. 4 and 5, in order to switch the connection destination of the low-pressure accumulator 52a from the hydraulic brake 20b to the hydraulic brake 20a, the regulating valve 40a,42a and the pressure reducing valve 44a,46a are opened and closed. A pressure loss is generated due to the opening and closing, and the pressure loss causes a variation in the pedaling force of the brake pedal 34. In the present embodiment, the booster 32 causes the brake pedal 34 to generate a reaction force corresponding to the pressure loss. The value of the reaction force corresponding to the pressure loss portion is calculated in advance. The pressure reflecting the pressure loss is set as the target pressure of the hydraulic brake, and the booster 32 adjusts the hydraulic braking force so that the hydraulic pressure becomes the target pressure.

Figure 6:
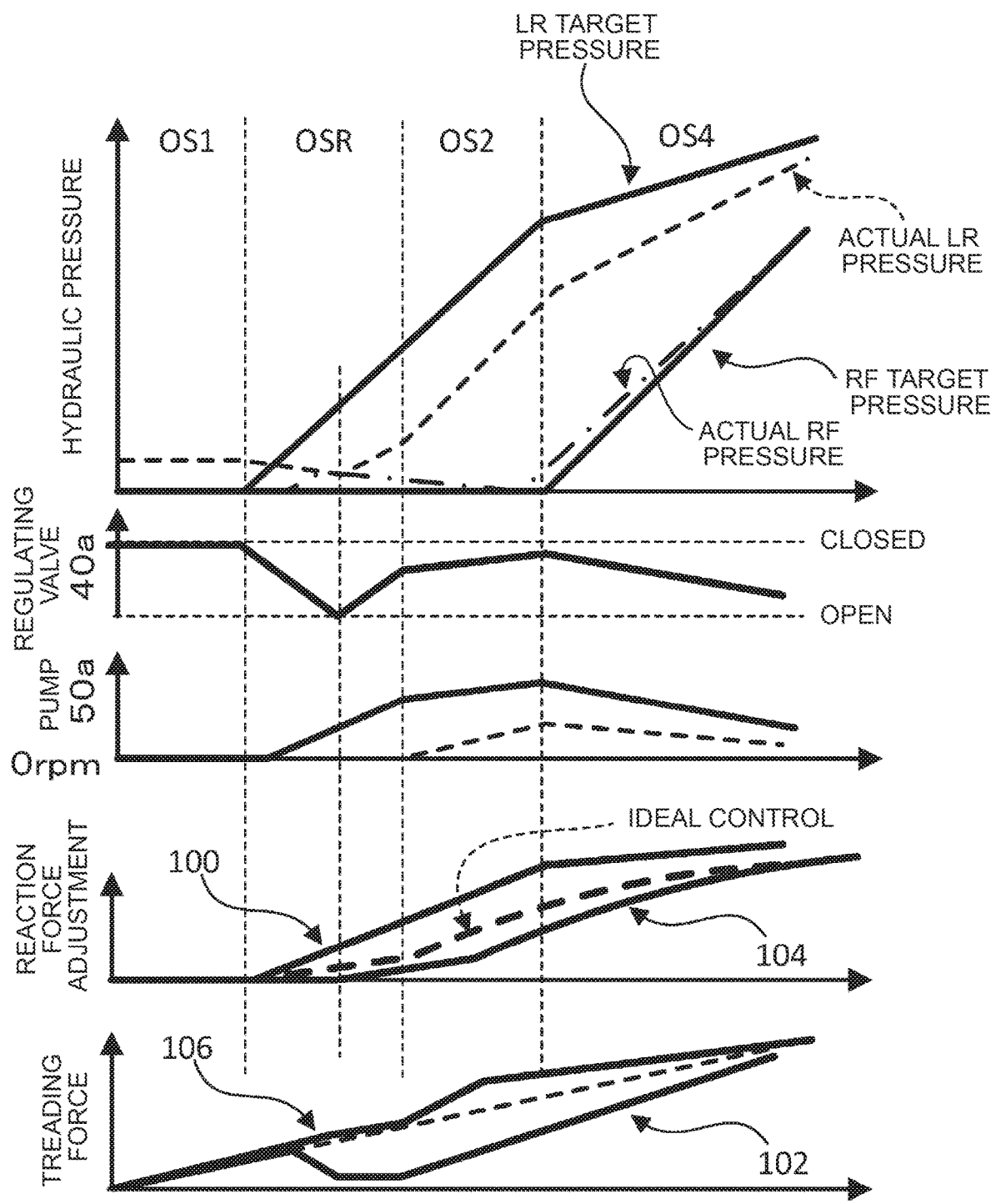
FIG. 6 is a graph showing a change in hydraulic pressure and the like according to a comparative example.
Figure 7:
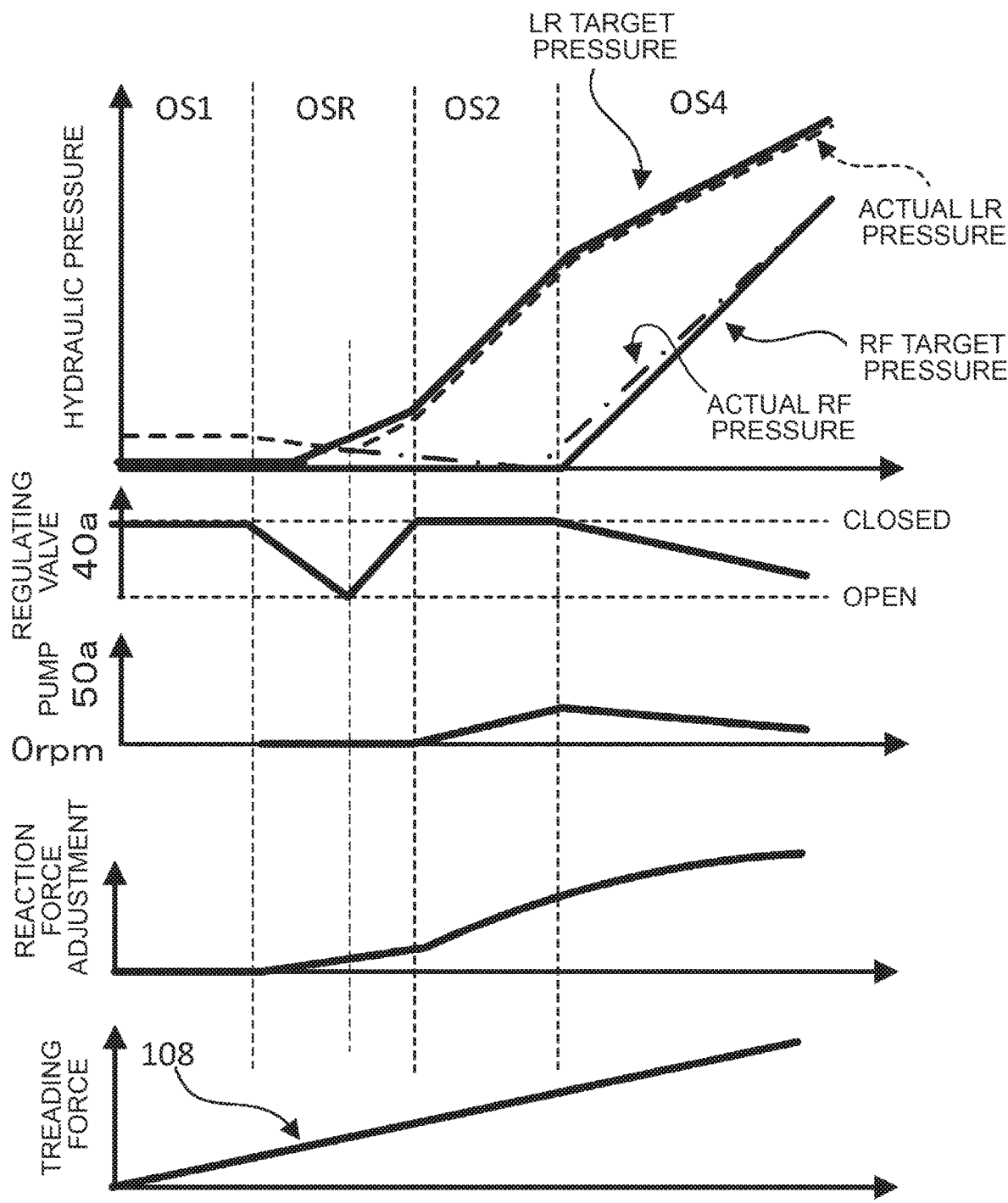
FIG. 7 is a graph illustrating a change in hydraulic pressure and the like according to the embodiment.

Hereinafter, the comparative example and the embodiment will be described with reference to FIGS. 6 and 7. FIG. 6 and FIG. 7 show temporal changes in the hydraulic pressure, the opening of the regulating valve 40a, the power of the pump 50a, the regulation of the reaction force, and the pedaling force. FIG. 6 shows each value according to the comparative example. FIG. 7 shows the values according to the embodiment. FIG. 6 and FIG. 7 show the respective states (OS1, OSR, OS2, OS4) of the first hydraulic circuit 30A.

In the comparative example, a target pressure in which the pressure loss portion is not reflected is set. For example, as indicated by reference numeral 100 in FIG. 6, the target pressure of the hydraulic brake in the left rear wheel LR does not reflect the pressure drop. Therefore, the actual pressure of the hydraulic brake of the left rear wheel LR is reduced by the pressure drop from the target pressure. As a result, as indicated by reference numeral 102 in FIG. 6, the pedaling force decreases, and a feeling of being drawn into the brake pedal 34 is generated.

In addition, it is conceivable that the pressure loss portion is actually detected by the hydraulic pressure sensor, and the reaction force is pseudo-generated while the detected value is fed back. However, as indicated by reference numeral 104 in FIG. 6, a delay occurs in the feedback-response due to the delay caused by CAN communication. As a result, as indicated by reference numeral 106 in FIG. 6, the pedaling force fluctuates, and a stepped feeling is generated in the brake pedal 34.

On the other hand, in the embodiment, the target pressure reflecting the pressure loss portion is set. Therefore, as shown in FIG. 7, the actual pressure of the hydraulic brake in the left rear wheel LR substantially coincides with the target pressure. As a result, the pedaling force does not decrease, and the brake pedal 34 does not feel retracted. In addition, since a delay in the feedback response does not occur, a stepped feeling does not occur. For example, a linear increase in pedaling force can be achieved, as indicated by reference numeral 108 in FIG. 7. Further, in the embodiment, the pulse rate of the pump 50a is also reduced.

Further, the regenerative brake is realized only by the braking force of the front wheels. When the hydraulic pressure is introduced into the front wheel, the nose-dive tendency becomes remarkable, and the stability of the vehicle is lowered. On the other hand, in the present embodiment, since the hydraulic pressure is introduced into the rear wheel, the stability of the vehicle is improved.

In addition, when the hydraulic pressure is introduced to the front wheels, if the regeneration amount is reduced in order to improve the stability of the vehicle, the fuel efficiency is deteriorated accordingly. On the other hand, in the present embodiment, since the hydraulic pressure is introduced into the rear wheel, it is not necessary to reduce the regeneration amount, and deterioration in fuel efficiency can be suppressed.

In addition, when the hydraulic pressure is introduced into the front wheel after the regenerative braking force reaches the upper limit, the brakes on the front wheel side are overused, so that the frequency of use of the brakes on the rear wheel is significantly reduced. Therefore, there is a possibility that the brake pad on the rear wheel side is stuck. On the other hand, in the present embodiment, since the hydraulic pressure is introduced into the rear wheel, such a situation does not occur. As a result, sticking of the brake pad on the rear wheel side can be suppressed.

Similarly, the opening and closing of the regulating valve 40b,42b and the pressure reducing valve 44b,46b are controlled in the second hydraulic circuit 30B.

What is claimed is:

1. A vehicle brake device comprising:
   a first hydraulic brake for generating a hydraulic braking force on a front wheel of a vehicle;
   a second hydraulic brake for generating a hydraulic braking force on a rear wheel of the vehicle;
   a regenerative brake for generating a regenerative braking force by converting kinetic energy to the front wheel;
   a booster for amplifying a depression force applied to a brake pedal and supplying the depression force to the first hydraulic brake or the second hydraulic brake by a brake fluid as the hydraulic braking force;
   a first regulating valve that is provided between the booster and the first hydraulic brake and that regulates a flow rate of the brake fluid supplied to the first hydraulic brake;

a first pressure reducing valve for reducing a pressure of the hydraulic braking force of the first hydraulic brake;

a second regulating valve that is provided between the booster and the second hydraulic brake and that regulates a flow rate of the brake fluid supplied to the second hydraulic brake;

a second pressure reducing valve for reducing a pressure of the hydraulic braking force of the second hydraulic brake; a low-pressure accumulator to which the brake fluid is supplied when the pressure is reduced by the first pressure reducing valve or the second pressure reducing valve; and a control device for controlling opening and closing of the first regulating valve, the first pressure reducing valve, the second regulating valve, and the second pressure reducing valve, wherein:

the vehicle brake device is able to distribute a braking force to the hydraulic braking force and the regenerative braking force;

when the regenerative braking force reaches an upper limit in a state in which the first regulating valve and the first pressure reducing valve are closed, and the low-pressure accumulator is connected to the second hydraulic brake via the second pressure reducing valve, the control device switches connection destination of the low-pressure accumulator from the second hydraulic brake to the first hydraulic brake by opening and closing the first regulating valve, the first pressure reducing valve, the second regulating valve, and the second pressure reducing valve so as to introduce the hydraulic braking force; and the booster generates, on the brake pedal, a reaction force corresponding to a pressure loss caused by the opening and closing of the first regulating valve, the first pressure reducing valve, the second regulating valve, and the second pressure reducing valve.

2. The vehicle brake device according to claim 1, wherein the control device opens the first pressure reducing valve to connect the low-pressure accumulator to the first hydraulic brake, opens the second regulating valve, and closes the first regulating valve and the second pressure reducing valve to introduce the hydraulic braking force.

\* \* \* \* \*